United States Patent
Mitchell et al.

(10) Patent No.: US 6,921,506 B1
(45) Date of Patent: Jul. 26, 2005

(54) METHOD OF MANUFACTURING A THERMAL INSULATION BODY

(75) Inventors: Matthew Benedict David Mitchell, Droitwich (GB); James David Joseph Jackson, Kidderminster (GB)

(73) Assignee: Microtherm International Limited (GB)

( * ) Notice: Subject to any disclaimer, the term of this patent is extended or adjusted under 35 U.S.C. 154(b) by 553 days.

(21) Appl. No.: 10/048,044

(22) PCT Filed: Jul. 28, 2000

(86) PCT No.: PCT/GB00/02909

§ 371 (c)(1), (2), (4) Date: Apr. 29, 2002

(87) PCT Pub. No.: WO01/09057

PCT Pub. Date: Feb. 8, 2001

(30) Foreign Application Priority Data

Jul. 31, 1999 (GB) .............................. 9917947

(51) Int. Cl.⁷ .......................... B29C 59/00; B29C 67/24
(52) U.S. Cl. ........................ 264/109; 264/122; 264/123
(58) Field of Search ................................ 264/109, 122, 264/123

(56) References Cited

U.S. PATENT DOCUMENTS

| 4,028,453 A | * | 6/1977 | Miller et al. ................. 264/638 |
| 4,069,060 A | * | 1/1978 | Hayashi et al. ............... 501/89 |
| 4,118,450 A |   | 10/1978 | Nakamura et al. |
| 4,150,078 A | * | 4/1979 | Miller et al. ................. 264/638 |

FOREIGN PATENT DOCUMENTS

| DE | 2634674 | 2/1978 |
| DE | 4212229 | 10/1993 |
| GB | 1580909 | 12/1980 |
| WO | 9817596 | 4/1998 |

OTHER PUBLICATIONS

International Search Report Oct. 24, 2000.

* cited by examiner

*Primary Examiner*—Stephen J. Lechert, Jr.
(74) *Attorney, Agent, or Firm*—Ira S. Dorman (57) ABSTRACT

A pressed thermal insulation body is made by a method comprising the steps of:

(1) providing a dry composition consisting of:
   (a) 10 to 100 percent by weight of volatilised silica containing a dispersion of 0.5 to 6 percent by weight of carbon;
   (b) 0 to 40 percent by weight of infra-red opacifier;
   (c) 0 to 50 percent by weight of particulate inorganic filler material; and
   (d) 0 to 25 percent by weight of reinforcing filaments;
(2) pressing the dry composition from step (1) to form a body of a desired shape and density; and
(3) heat treating the pressed body at a temperature in the range from 400 degrees Celsius to 1000 degrees Celsius to effect hardening.

39 Claims, 3 Drawing Sheets fig.1

Fig.2 fig.3 fig.4 fig.5 fig.6 fig.7

METHOD OF MANUFACTURING A THERMAL INSULATION BODY

This application claims benefit under 35 U.S.C. 371 of PCT/GB00/02909, filed on Jul. 28, 2000.

This invention relates to a method of manufacturing a pressed thermal insulation body. Such a body may be used, for example, as an outer part, distance piece or wall in heaters for glass-ceramic cooking appliances, or as insulation in storage radiators.

WO-A-9817596 discloses the production of an insulating material particularly for use as walls in heaters for glass-ceramic cooking appliances. The insulating material is based on expanded vermiculite, inorganic binder, microporous material, reinforcing fibres and an infra-red opacifier. The fibres are selected from silica, vitreous silica, R glass, S glass, ECR glass, and similar glasses and mixtures thereof. The reinforcing fibres used contain a maximum of 2 percent by weight of boric oxide and a maximum of 2 percent by weight of alkali metal oxides. Glasses having greater than 2 percent by weight of boric oxide and of alkali metal oxides are excluded as they are said to promote corrosion of heating elements in heaters for cooking appliances.

The insulating material described in WO-A-9817596 is said to have better heat insulating properties than are achieved with mica grain particles, such as vermiculite, compressed with a binder and described, for example, in EP-A-0 204 185. However, insulation bodies produced according to WO-A-9817596 still have a higher than ideal thermal conductivity, although opacifiers can be added to reduce the thermal conductivity at elevated temperatures.

The addition of a low density microporous material reduces the density of the final moulded body whilst retaining flexural strength and the presence of the reinforcing fibres results in adequate resistance to mechanical damage.

In an alternative approach, as demonstrated in EP-A-0 560 479, a thermal insulation body comprises a low-density microporous material, such as an aerogel, pyrogenic or precipitated silica, and reinforcing glass filaments such as E glass, R glass or S glass. Although such an insulation body has excellent thermal insulation properties, it has less strength than a bonded vermiculite body or a composite body containing vermiculite.

It would be possible to use a higher density material, such as silica fume/volatilised silica, in the production of moulded bodies but these are, at a corresponding density, weaker than bodies made with pyrogenic silica. Furthermore, the thermal conductivity is higher. These materials are to some extent self-opacifying as they contain a small percentage of very well dispersed carbon.

Volatilised silica is produced as a by-product of the manufacture of silicon or ferro-silicon metal. Silica in the form of sand or quartzite is reduced using coal, charcoal, etc. in an electric furnace to form silicon metal. The fumes resulting from this action contain silica and carbon and are collected in hoppers. The chemistry of volatilised silica depends on the type of plant (i.e. silicon or ferro-silicon). The silica content ranges from 84 to 98% by weight, with that of the silica fume produced in silicon metal plants being between 92 and 98%. The carbon content of the material varies from plant to plant and can range from 0.5 to 6%. Generally the level is around 0.8 to 2%.

The drawback of volatilised silica is its high bulk density when compared to the silica used in a number of microporous insulations. When compressed, the block density has to be correspondingly higher than other forms of microporous insulation. However it is possible to produce handleable blocks at high density which still have acceptable thermal conductivities. Compared to bonded vermiculite or vermiculite composite bodies these mouldings are weak.

We have now found that the strength of thermal insulation bodies based on volatilised silica increases when subjected to heat treatment and the strength shows an unexpectedly rapid increase with increasing temperature.

According to the invention there is provided a method of manufacturing a pressed thermal insulation body comprising the steps of;
(1) providing a dry composition consisting of:
 (a) 10 to 100 percent by weight of volatilised silica containing a dispersion of 0.5 to 6 percent by weight of carbon;
 (b) 0 to 40 percent by weight of infra-red opacifier;
 (c) 0 to 50 percent by weight of particulate inorganic filler material; and
 (d) 0 to 25 percent by weight of reinforcing filaments;
(2) pressing the dry composition from step (1) to form a body of a desired shape and density; and
(3) heat treating the pressed body at a temperature in the range from 400 degrees Celsius to 1000 degrees Celsius to effect hardening thereof.

Preferably 80 to 98 percent by weight of the volatilised silica, and more preferably 88 to 98 percent by weight of the volatilised silica, is provided in the composition.

Preferably the carbon content of the volatilised silica is from 0.8 to 2 percent by weight.

During heating of the body the carbon is suitably burnt away such that less than 0.1 percent by weight thereof remains with reference to the volatilised silica.

Preferably the body is heated to a temperature in the range from 450 degrees Celsius to B00 degrees Celsius. More preferably the body is heated to a temperature in the range from 500 degrees Celsius to 800 degrees Celsius, and most preferably the body is heated to a temperature in the range from 600 degrees Celsius to 800 degrees Celsius.

Preferably 0 to 30 percent by weight of the infra-red opacifier is provided.

The infra-red opacifier may be a material which scatters or absorbs infra-red radiation and may be selected from titanium oxide, iron oxide, mixtures of titanium oxide and iron oxide, zirconium oxide, zirconium silicate, chromium oxide and silicon carbide.

Preferably 0 to 30 percent by weight of the particulate inorganic filler material is provided.

The particulate inorganic filler material may be selected from manganese oxide and material of low density, and mixtures thereof. The low density material may be selected from silica, titania, alumina, vermiculite, perlite, expanded clays and glass microspheres. The silica, titania or alumina may be of a form selected from aerogel, xerogel, pyrogenic, hydrophobic pyrogenic and precipitated forms.

Preferably from 2 to 10 percent by weight of the reinforcing filaments are provided.

The reinforcing filaments may be a stable material such as selected from silica, quartz, E glass and modifications thereof, S glass and modifications thereof, R glass, ECR glass, C glass, A glass, ceramic fibre materials, body-fluid-soluble fibres, and mixtures thereof.

The density of the pressed composition may be from 300 to 1200 kg/m$^3$ and preferably from 500 to 800 kg/n$^3$.

The heat treated body may have a Shore A hardness greater than 50, preferably greater than 65, and most preferably not less than about 80.

The heat treated body may have a flexural strength greater than 450 kN/m$^2$, preferably greater than 600 kN/m$^2$, most preferably not less than about 1000 kN/m$^3$.

A number of firing techniques can be used for effecting the necessary heating of the pressed body. Gas or electric powered furnaces or infra-red or microwave heating equipment are applicable, being arranged to effect a rise in temperature of the body to from 400 degrees Celsius to 1000 degrees Celsius and preferably to from 450 degrees Celsius to 800 degrees Celsius. The required heating time depends upon the cross-section of the body.

In addition to an increase of flexural strength of the body with temperature, surface hardness of the body also increases. If only surface hardening is required, a heating time of about 5 minutes at 600 degrees Celsius is all that is necessary for virtually any cross-section of body. However, for full hardening longer heating times may be necessary. The time and temperature of heating is selected by simple experiment whereby the body hardens sufficiently without undergoing any significantly measurable change in dimensions or pore volume.

Although it is not intended that the invention be bound by any specific theory, it is believed that hardening occurs because the volatilised silica particles are coated with carbon soot, in addition to any coarser carbon particles that may be present. In the dry composition state the soot limits the bonding between the silica particles which occurs either by hydrogen bonding or condensation of adjacent Si—OH groups. On heating the material to temperatures at which carbon removal can occur, this soot layer begins to break down. This allows hydrogen bonding and condensation of adjacent Si—OH groups to form bridging oxygens between particles, Si—O—Si. The formation of bridging oxygens would also occur with Si—OH groups from the surface of any glass filaments used as reinforcement, making the reinforcement much more effective. This mechanism could account for the observed increase in flexural strength.

Bodies manufactured according to the invention can be used in a range of applications. For example they may be used as distance pieces or walls in radiant electric heaters, as bases for storage radiators, as facings for furnaces and incinerators, and as rigid evacuable boards for vacuum use.

In a particular embodiment of the present invention there is provided a method as hereinbefore defined of manufacturing a pressed thermal insulation body in the form of an outer part for a heater comprising the steps of:

(1) providing a dry composition consisting of:
 (a) 65 to 98 percent by weight of volatilised silica containing a dispersion of 0.5 to 6 percent by weight of carbon;
 (b) 0 to 20 percent by weight of infra-red opacifier;
 (c) 0 to 10 percent by weight of particulate inorganic filler material; and
 (d) 1 to 15 percent by weight of reinforcing filaments;
(2) pressing the dry composition from step (1) to form an outer part of a heater of a desired shape and density; and
(3) heat treating the pressed outer part at a temperature in the range from 500 degrees Celsius to 900 degrees Celsius to effect hardening thereof.

Preferably 83 to 98 percent by weight of the volatilised silica is provided in the composition.

Preferably the carbon content of the volatilised silica is from 0.8 to 2 percent by weight.

During heating of the body the carbon is suitably burnt away such that less than 0.1 percent by weight thereof remains with reference to the volatilised silica.

The particulate inorganic filler may be selected from pyrogenic and hydrophobic pyrogenic silica and mixtures thereof.

Preferably from 2 to 10 percent by weight of the reinforcing filaments are provided.

The reinforcing filaments may be selected from silica, quartz, E glass and modifications thereof, S glass and modifications thereof, R glass, ECR glass, C glass, A glass, ceramic fibre materials, body-fluid-soluble fibres, and mixtures thereof.

Preferably the density of the pressed composition is from 500 to 800 kg/m$^3$.

Preferably the heat treated outer part has a flexural strength greater than 450 kN/m$^2$, more preferably greater than 600 kN/m$^2$.

Preferably the outer part is heat treated for from 15 to 25 minutes, for example about 20 minutes.

The method may include the further step of co-moulding a heating element with the outer part as the outer part is pressed. A connector block may be co-moulded with the heating element.

For a better understanding, the invention is now described with reference to the following examples.

EXAMPLE 1 (COMPARATIVE)

A composition was produced consisting of:

80 percent by weight of micron grade vermiculite supplied by Hoben Davis, UK.

20 percent by weight of water glass K66 binder supplied by Crosfield, UK.

The composition was compressed to provide a dry density of 600 kg/m$^3$ and dried at a temperature of 300 degrees Celsius for 30 minutes.

EXAMPLE 2 (COMPARATIVE)

A composition was produced consisting of:

64 percent by weight of micron grade vermiculite supplied by Hoben Davis, UK.

20 percent by weight of water glass K66 binder supplied by Crosfield, UK.

14.4 percent by weight of pyrogenic silica A200, supplied by Degussa-Hüls, Hanau, Germany.

1.6 percent by weight of E glass (P201) reinforcing fibres, supplied by Vetrotex, France.

The composition was compressed to provide a dry density of 600 kg/m$^3$ and dried at a temperature of 300 degrees Celsius for 30 minutes.

EXAMPLE 3 (COMPARATIVE)

A composition was produced consisting of:

65.1 percent by weight of pyrogenic silica A200, supplied by Degussa-Hüls, Germany.

19.6 percent by weight of rutile opacifier, supplied by Tilcon, UK.

5.4 percent by weight of Advantex E glass filaments, supplied by OCF, USA.

9.0 percent by weight of water.

0.9 percent by weight of ammonium bicarbonate, grade FFQ, supplied by Brotherton, UK.

The composition was compressed to provide a dry density of 400 kg/m$^3$ and dried at a temperature of 150 degrees Celsius for 30 minutes.

EXAMPLE 4

A composition was produced consisting of:

98 percent by weight of fumed silica containing a dispersion of 0.8 to 2 percent by weight of carbon and supplied by VAW, Germany.

2 percent by weight of Advantex E glass filaments, supplied by OCF, USA.

The composition was compressed to form blocks of dimensions 110 mm by 40 mm by 10 mm, for flexural strength testing, and also to form discs of 110 mm diameter and 25 mm thickness, for thermal conductivity testing. The compressed density was 700 kg/m$^3$. The blocks were fired for 10 minutes at each of a range of temperatures up to 800 degrees Celsius. The discs were fired for 30 minutes at 700 degrees Celsius.

EXAMPLE 5

A composition was produced consisting of:

88 percent by weight of fumed silica containing a dispersion of 0.8 to 2 percent by weight of carbon and supplied by VAW, Germany.

2 percent by weight of Advantex E glass filaments, supplied by OCF, USA.

10 percent by weight of rutile opacifier, supplied by Tilcon, UK.

The composition was compressed to form blocks of dimensions 110 mm by 40 mm by 10 mm, for flexural strength testing, and also to form discs of 110 mm diameter and 25 mm thickness, for thermal conductivity testing. The compressed density was 700 kg/m$^3$. The blocks were fired for 10 minutes at 700 degrees Celsius and the discs were fired for 30 minutes at 700 degrees Celsius.

The flexural strength, thermal conductivity and Shore A hardness, measured for the samples prepared in Examples 1 to 5, are summarised in the following Table 1.

TABLE 1

| Example | Flexural strength (kN/m$^2$) | Thermal conductivity (w/mK) 200° C. (mean) | Thermal conductivity (w/mK) 400° C. (mean) | Shore A Hardness |
|---|---|---|---|---|
| 1 | 1550 | 0.245 | 0.360 | 75 |
| 2 | 1450 | 0.176 | 0.250 | 75 |
| 3 | 700 | 0.029 | 0.034 | 55 |
| 4 Unfired | 480 | 0.058 | 0.074 | 51 |
| 4 400° C. | 480 | — | — | 67 |
| 4 500° C. | 600 | — | — | 80 |
| 4 600° C. | 1450 | — | — | 90 |
| 4 700° C. | 1950 | 0.081 | 0.105 | 98 |
| 4 800° C. | 3200 | — | — | 98 |
| 5 Unfired | 420 | 0.056 | 0.064 | 48 |
| 5 700° C. | 1700 | 0.076 | 0.089 | 95 |

It is seen that in the case of Examples 4 and 5, the method of the invention results in an unexpectedly large increase in flexural strength of the pressed blocks as the firing temperature is increased. With firing temperatures above 600 degrees Celsius, the flexural strength is considerably greater than that of pressed bodies of glass filament reinforced pyrogenic silica (Example 3) and also greater than that of pressed bodies based on vermiculite (Examples 1 and 2).

The thermal conductivity of the pressed discs manufactured according to the method of the invention (Examples 4 and 5) is also seen to be considerably lower than that of the pressed bodies based on vermiculite (Examples 1 and 2).

Furthermore, the pressed bodies manufactured according to the method of the invention and fired, show increasing Shore A hardness values with increasing firing temperature. It is possible to select a short firing time such that only an outer surface skin is hardened. With increasing firing time, the depth of hardening increases, up to the full depth.

EXAMPLE 6

A composition was produced consisting of:

94 percent by weight of fumed silica containing a dispersion of 0.8 to 2 percent by weight of carbon and supplied by VAW, Germany.

1 percent by weight of A200 pyrogenic silica supplied by Degussa-Hüls, Germany.

5 percent by weight of Advantex E glass filaments, supplied by OCF, USA.

The composition was compressed to form blocks of dimensions 110 mm by 40 mm by 10 mm, for flexural strength testing, and also to form discs of 110 mm diameter and 25 mm thickness, for thermal conductivity testing. The compressed density for the blocks was 700 kg/m$^3$, while the compressed density for the discs was 600 kg/m$^3$. The blocks were fired for 10 minutes at 700 degrees Celsius. The discs were not fired.

EXAMPLE 7

A composition was produced consisting of:

89 percent by weight of fumed silica containing a dispersion of 0.8 to 2 percent by weight of carbon and supplied by VAW, Germany.

1 percent by weight of A200 pyrogenic silica supplied by Degussa-Hüls, Germany.

10 percent by weight of Advantex E glass filaments, supplied by OCF, USA.

The composition was compressed to form blocks of dimensions 110 mm by 40 mm by 10 mm, for flexural strength testing, and also to form discs of 110 mm diameter and 25 mm thickness, for thermal conductivity testing. The compressed density for the blocks was 700 kg/m$^3$, while the compressed density for the discs was 600 kg/m$^3$. The blocks were fired for 10 minutes at 700 degrees Celsius. The discs were not fired.

EXAMPLE 8

A composition was produced consisting of:

97 percent by weight of fumed silica containing a dispersion of 0.8 to 2 percent by weight of carbon and supplied by VAW, Germany.

1 percent by weight of A200 pyrogenic silica supplied by Degussa-Hüls, Germany.

2 percent by weight of Advantex E glass filaments, supplied by OCF, USA.

The composition was compressed to form blocks of dimensions 110 mm by 40 mm by 10 mm, for flexural strength testing, and also to form discs of 110 mm diameter and 25 mm thickness, for thermal conductivity testing. The compressed density for the blocks was 700 kg/m$^3$, while the compressed density for the discs was 600 kg/m$^3$. The blocks were fired for 10 minutes at 700 degrees Celsius. The discs were not fired.

EXAMPLE 9

A composition was produced consisting of:

93 percent by weight of fumed silica containing a dispersion of 0.8 to 2 percent by weight of carbon and supplied by VAW, Germany.

5 percent by weight of A200 pyrogenic silica supplied by Degussa-Hüls, Germany.

2 percent by weight of Advantex E glass filaments, supplied by OCF, USA.

The composition was compressed to form blocks of dimensions 110 mm by 40 mm by 10 mm, for flexural strength testing, and also to form discs of 110 mm diameter and 25 mm thickness, for thermal conductivity testing. The compressed density for the blocks was 700 kg/m$^3$, while the compressed density for the discs was 600 kg/m$^3$. The blocks were fired for 10 minutes at 700 degrees Celsius. The discs were not fired.

EXAMPLE 10

A composition was produced consisting of:

92 percent by weight of fumed silica containing a dispersion of 0.8 to 2 percent by weight of carbon and supplied by VAW, Germany.

1 percent by weight of A200 pyrogenic silica supplied by Degussa-Hüls, Germany.

2 percent by weight of Advantex E glass filaments, supplied by OCF, USA.

5 percent by weight of manganese oxide supplied by Scientific and Chemical Supplies Limited, United Kingdom.

The composition was compressed to form blocks of dimensions 110 mm by 40 mm by 10 mm, for flexural strength testing, and also to form discs of 110 mm diameter and 25 mm thickness, for thermal conductivity testing. The compressed density for the blocks was 700 kg/m$^3$, while the compressed density for the discs was 600 kg/m$^3$. The blocks were fired for 10 minutes at 700 degrees Celsius. The discs were not fired.

EXAMPLE 11

A composition was produced consisting of:

94 percent by weight of fumed silica containing a dispersion of 0.8 to 2 percent by weight of carbon and supplied by VAW, Germany.

4 percent by weight of R974 hydrophobic pyrogenic silica supplied by Degussa-Hüls, Germany.

2 percent by weight of Advantex E glass filaments, supplied by OCF, USA.

The composition was compressed to form blocks of dimensions 110 mm by 40 mm by 10 mm, for flexural strength testing, and also to form discs of 110 mm diameter and 25 mm thickness, for thermal conductivity testing. The compressed density for the blocks was 700 kg/m$^3$, while the compressed density for the discs was 600 kg/m$^3$. The blocks were fired for 10 minutes at 700 degrees Celsius. The discs were not fired.

EXAMPLE 12 (COMPARATIVE)

A composition was produced consisting of:

98 percent by weight of A200 pyrogenic silica supplied by Degussa-Hüls, Germany.

2 percent by weight of Advantex E glass filaments, supplied by OCF, USA.

The composition was compressed to form blocks of dimensions 110 mm by 40 mm by 10 mm, for flexural strength testing. The compressed density was 200 kg/m$^3$. The blocks were fired for 10 minutes at 700 degrees Celsius.

EXAMPLE 13 (COMPARATIVE)

A composition was produced consisting of:

58.2 percent by weight of A200 pyrogenic silica supplied by Degussa-Hüls, Germany.

38.8 percent by weight of rutile supplied by Tilcon, United Kingdom.

2 percent by weight of Advantex E glass filaments, supplied by OCF, USA.

The composition was compressed to form blocks of dimensions 110 mm by 40 mm by 10 mm, for flexural strength testing, and also to form discs of 110 mm diameter and 25 mm thickness, for thermal conductivity testing. The compressed density was 350 kg/m$^3$. The blocks were fired for 10 minutes at 700 degrees Celsius. The discs were not fired.

The thermal conductivity measured for the samples prepared in Examples 6 to 11 and 13 is summarised in the following Table 2.

TABLE 2

| | Thermal conductivity W/mK | |
|---|---|---|
| Example | 200° C. (mean) | 400° C. (mean) |
| 6 | 0.055 | 0.072 |
| 7 | 0.062 | 0.078 |
| 8 | 0.052 | 0.075 |
| 9 | 0.053 | 0.068 |
| 10 | 0.050 | 0.065 |
| 11 | 0.048 | 0.068 |
| 13 | 0.024 | 0.028 |

The flexural strength and Shore A hardness, measured for the samples prepared in Examples 6 to 13, are summarised in the following Table 3.

TABLE 3

| | Flexural strength kN/m$^2$ | | Shore A hardness | |
|---|---|---|---|---|
| Example | Before firing | After firing | Before firing | After firing |
| 6 | 355 | 2600 | 62 | 88 |
| 7 | 220 | 1550 | 70 | 86 |
| 8 | 260 | 1700 | 63 | 92 |
| 9 | 200 | 1120 | 64 | 85 |
| 10 | 250 | 1700 | 65 | 90 |
| 11 | 200 | 1600 | 65 | 88 |
| 12 | 35 | 50 | 37 | 46 |
| 13 | 75 | 105 | 20 | 30 |

Thus Examples 6 to 11 confirm the conclusions drawn from Examples 4 and 5, that is the method according to the invention results in an unexpectedly large increase in flexural strength of the pressed blocks as a result of firing together with an unexpectedly high Shore A hardness. None of the comparative examples is able to demonstrate the same combination of flexural strength and surface hardness, coupled with a low thermal conductivity.

BRIEF DESCRIPTION OF THE DRAWINGS

For a better understanding of the present invention and to show more clearly how it may be carried into effect reference will now be made, by way of example, to the accompanying drawings in which.

Figure 1:
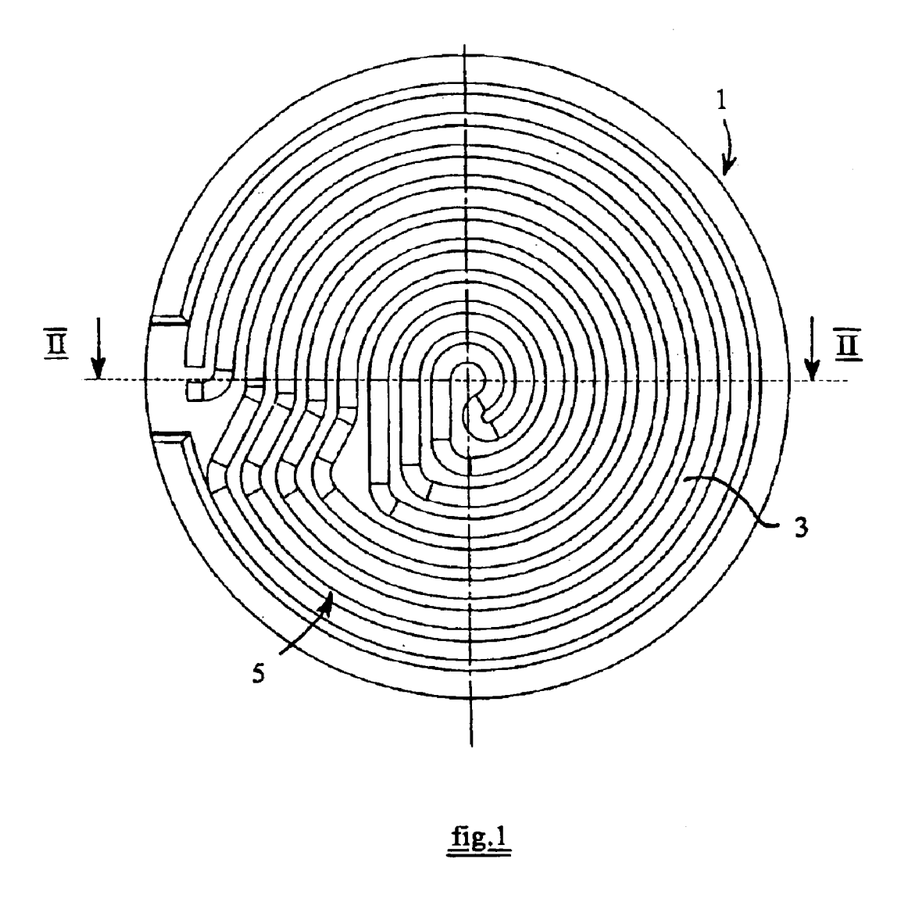
FIG. 1 is a plan view of one embodiment of an outer part of a heater made according to the present invention.
Figure 2:
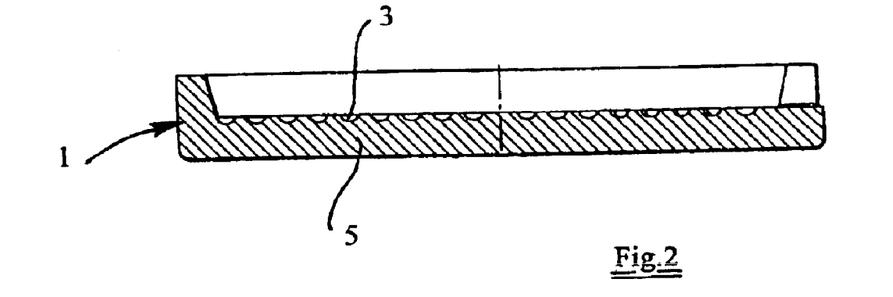
FIG. 2 is a cross-sectional view taken along the line II—II in FIG. 1.

The outer part of a heater shown in FIGS. 1 and 2 is made by producing one of a number of compositions consisting of:

65 to 98 percent by weight of fumed silica containing a dispersion of 0.8 to 2 percent by weight of carbon and supplied by VAW, Germany;

1 to 15 percent by weight of permanent reinforcing filaments in the form of Advantex E glass filaments supplied by OCF, USA;

0 to 10 percent by weight of particulate inorganic filler material in the form of A200 pyrogenic silica or R974 hydrophobic pyrogenic silica both supplied by Degussa-Huls, Germany; and 0 to 20 percent by weight of infra-red opacifier in the form of rutile supplied by Tilcon, UK.

The dry composition is then pressed as will be described in more detail hereinafter to a desired shape and having a suitable density, such as in the range from 500 to 800 kg/m$^3$, and is heat treated at a temperature in the range from 500 degrees Celsius to 900 degrees Celsius for a suitable time, such as 15 to 25 minutes.

Specific compositions are illustrated by the following examples:

EXAMPLE 14

A composition was produced consisting of 98 percent by weight of fumed silica and 2 percent by weight of glass filaments. The mixture was compressed to the configuration shown in FIGS. 1 and 2 to form the outer part 1 of a heater for a glass ceramic cook-top. The mixture was compressed to a density of 700 kg/m$^3$ and was heat treated at 800 degrees Celsius for 20 minutes.

Although not illustrated, the heater was completed by gluing a pre-formed heating element into the grooves 3 formed in the base 5 of the outer part 1, together with a connector block and a conventional temperature limiting device using an adhesive such as CLAYSIL produced by Crosfield or HT 10.02 produced by Idenden.

The thermal conductivity of the outer part of the heater was found to be 0.105 W/(mK) and the flexural strength was 1400 kN/m$^2$.

EXAMPLE 15

Figure 3:
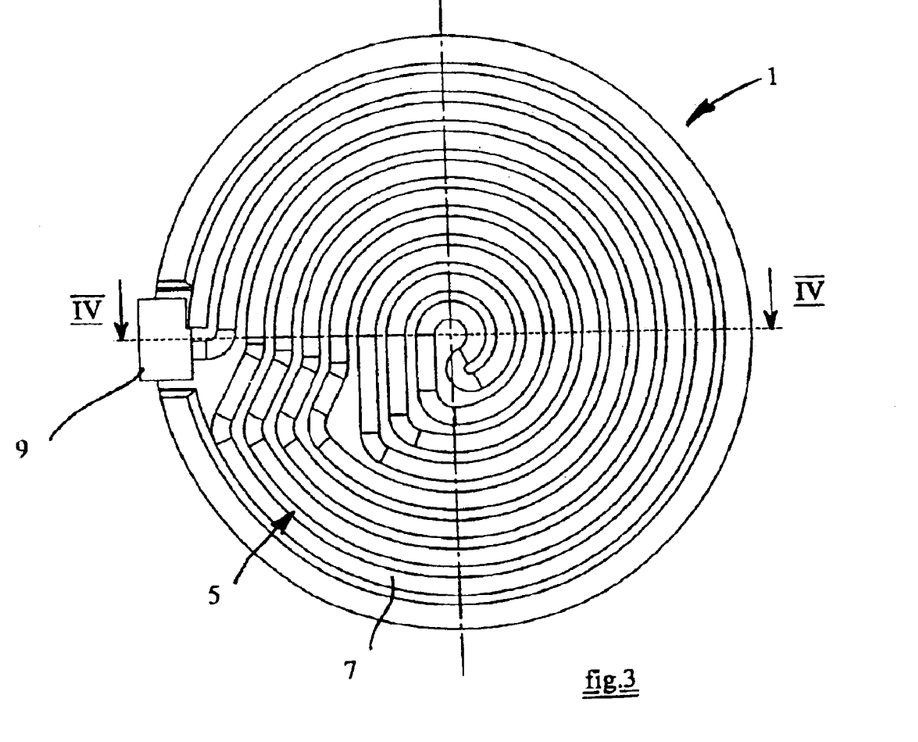
FIG. 3 is a plan view of an embodiment of a heater incorporating an outer part made according to the present invention.
Figure 4:
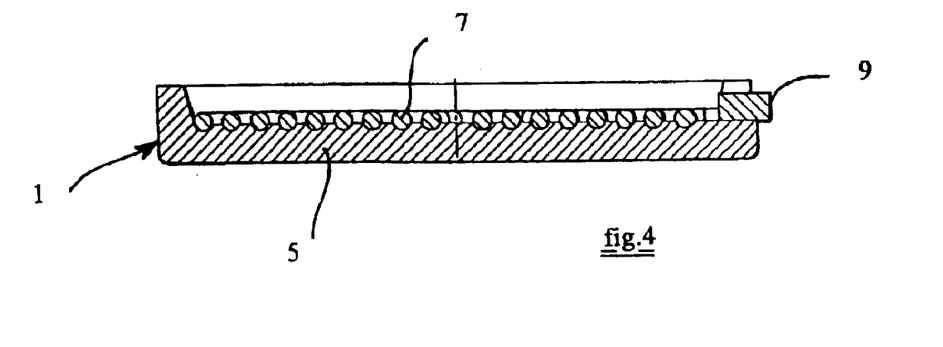
FIG. 4 is a cross-sectional view taken along the line IV—IV in FIG. 3.

A composition was produced consisting of 96 percent by weight of fumed silica, 2 percent by weight of glass filaments and 2 percent by weight pyrogenic silica. The mixture was placed in a mould containing a heating element 7 attached to a connector block 9 and was compressed to the configuration shown in FIGS. 3 and 4 to form the outer part 1 of a heater for a glass ceramic cook-top having a heating element 7 incorporated into the base 5 thereof. The mixture was compressed to a density of 600 kg/m$^3$ and was heat treated at 800 degrees Celsius for 20 minutes.

Although not illustrated, the heater was completed by gluing a conventional temperature limiting device to the outer part using an adhesive such as CLAYSIL produced by Crosfield or HT 10.02 produced by Idenden. Alternatively, suitable clips could be used.

The thermal conductivity of the outer part of the heater was found to be 0.066 W/(mK) and the flexural strength was 1135 kN/m$^2$.

EXAMPLE 16

A composition was produced consisting of 93 percent by weight of fumed silica, 2 percent by weight of glass filaments and 5 percent by weight pyrogenic silica. As with Example 15, the mixture was placed in a mould containing a heating element 7 attached to a connector block 9 and was compressed to the configuration shown in FIGS. 3 and 4 to form the outer part 1 of a heater for a glass ceramic cook-top having a heating element 7 incorporated into the base 5 thereof. The mixture was compressed to a density of 500 kg/m$^3$ and was heat treated at 800 degrees Celsius for 20 minutes.

Although not illustrated, the heater was completed by gluing a conventional temperature limiting device to the outer part using an adhesive such as CLAYSIL produced by Crosfield or HT 10.02 produced by Idenden. Alternatively, other fixing means such as suitable clips could be used.

The thermal conductivity of the outer part of the heater was found to be 0.061 W/(mK) and the flexural strength was 730 kN/m$^2$.

EXAMPLE 17

A composition was produced consisting of 93 percent by weight of fumed silica, 2 percent by weight of glass filaments and 5 percent by weight hydrophobic pyrogenic silica. As with Example 15, the mixture was placed in a mould containing a heating element 7 attached to a connector block 9 and was compressed to the configuration shown in FIGS. 3 and 4 to form the outer part 1 of a heater for a glass ceramic cook-top having a heating element 7 incorporated into the base 5 thereof. The mixture was compressed to a density of 500 kg/m$^3$ and was heat treated at 800 degrees Celsius for 20 minutes.

Although not illustrated, the heater was completed by gluing a conventional temperature limiting device to the outer part using an adhesive such as CLAYSIL produced by crosfield or HT 10.02 produced by Idenden. Alternatively, other fixing means such as suitable clips could be used.

The thermal conductivity of the outer part of the heater was found to be 0.061 W/(mK) and the flexural strength was 770 kN/m$^2$.

EXAMPLE 18

A composition was produced consisting of B3 percent by weight of fumed silica, 10 percent by weight rutile, 2 percent by weight of glass filaments and 5 percent by weight pyrogenic silica. As with Example 15, the mixture was placed in a mould containing a heating element 7 attached to a connector block 9 and was compressed to the configuration shown in FIGS. 3 and 4 to form the outer part 1 of a heater for a glass ceramic cook-top having a heating element 7 incorporated into the base 5 thereof. The mixture was compressed to a density of 600 kg/m$^3$ and was heat treated at 800 degrees Celsius for 20 minutes.

Although not illustrated, the heater was completed by gluing a conventional temperature limiting device to the outer part using an adhesive such as CLAYSIL produced by Crosfield or HT 10.02 produced by Idenden. Alternatively, other fixing means such as suitable clips could be used.

The thermal conductivity of the outer part of the heater was found to be 0.054 W/(mK) and the flexural strength was 670 kN/m$^2$.

Figure 5:
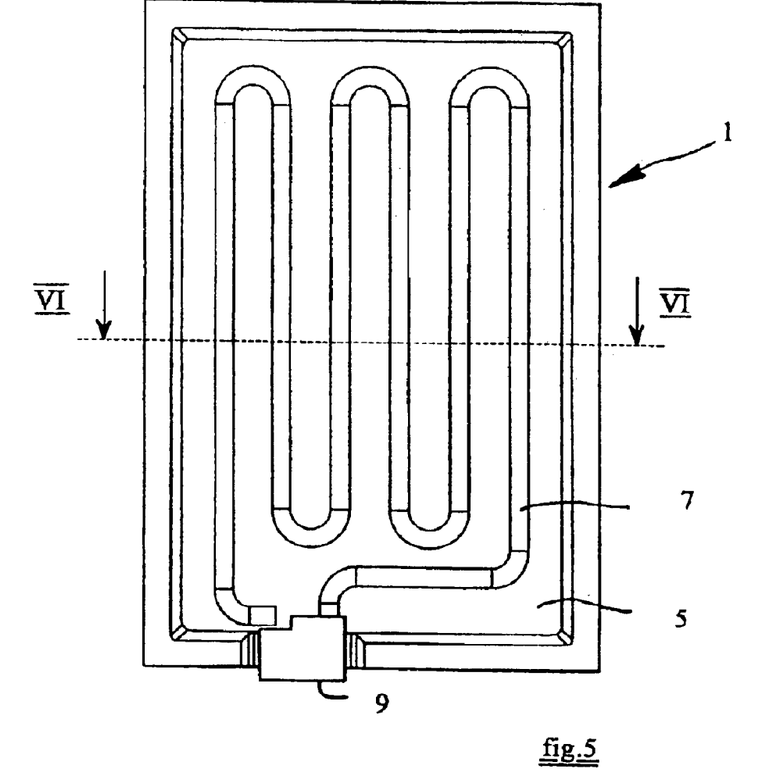
FIG. 5 is a plan view of an embodiment of a heater incorporating an outer part made according to the present invention.
Figure 6:
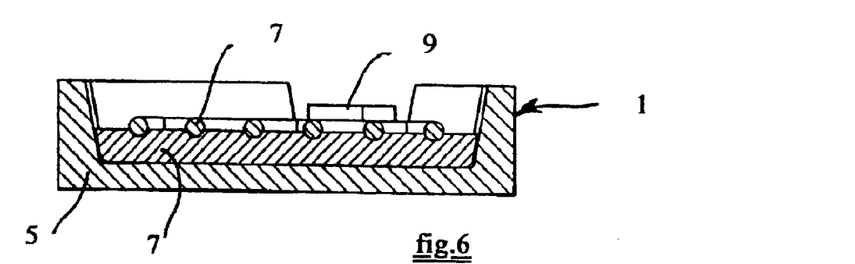
FIG. 6 is a cross-sectional view taken along the line VI—VI in FIG. 5.

FIGS. 5 and 6 show that the heater can be made in alternative shapes, such as rectangular in addition to circular, and that the heating element 7 can be mounted on a separate insulating base 11 having a composition similar to that of comparative Example 13, the separate insulating base having a relatively low thermal conductivity, but correspondingly lower flexural strength and hardness.

Figure 7:
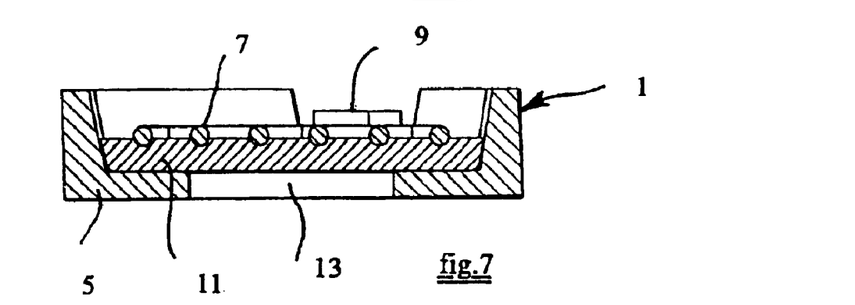
FIG. 7 is a cross-sectional view taken along the line VI—VI in FIG. 5 and showing an alternative form for the outer part.

FIG. 7 shows that, where a separate insulating base 11 is provided, the base 5 of the outer part 1 can be formed with an aperture 13 in order to reduce weight and cost.

What is claimed is:

1. A method of manufacturing a pressed thermal insulation body comprising the steps of:
   (1) providing a dry composition consisting of:
      (a) 10 to 100 percent by weight of volatilised silica containing a dispersion of 0.5 to 6 percent by weight of carbon;
      (b) 0 to 40 percent by weight of infra-red opacifier;
      (c) 0 to 50 percent by weight of particulate inorganic filler material; and
      (d) 0 to 25 percent by weight of reinforcing filaments;
   (2) pressing the dry composition from step (1) to form a body of a desired shape and density; and
   (3) heat treating the pressed body at a temperature in the range from 400 degrees Celsius to 1000 degrees Celsius to effect hardening thereof.

2. A method according to claim 1, wherein 80 to 98 percent by weight of the volatilised silica is provided in the composition.

3. A method according to claim 2, wherein 88 to 98 percent of the volatilised silica is provided in the composition.

4. A method according to claim 1, wherein the carbon content of the volatilised silica is from 0.8 to 2 percent by weight.

5. A method according to claim 1, wherein during heating of the body the carbon is burnt away such that less than 0.1 percent by weight thereof remains with reference to the volatilised silica.

6. A method according to claim 1, wherein the body is heated to a temperature in the range from 450 degrees Celsius to 800 degrees Celsius.

7. A method according to claim 6, wherein the body is heated to a temperature in the range from 500 degrees Celsius to 800 degrees Celsius.

8. A method according to claim 7, wherein the body is heated to a temperature in the range from 600 degrees Celsius to 800 degrees Celsius.

9. A method according to claim 1, wherein no more than 30 percent by weight of the infra-red opacifier is provided.

10. A method according to claim 1, wherein the infra-red opacifier is a material which scatters or absorbs infra-red radiation.

11. A method according to claim 10, wherein the infra-red opacifier is selected from titanium oxide, iron oxide, mixtures of titanium oxide and iron oxide, zirconium oxide, zirconium silicate, chromium oxide and silicon carbide.

12. A method according to claim 1, wherein no more than 30 percent by weight of the particulate inorganic filler material is provided.

13. A method according to claim 1, wherein the particulate inorganic filler material is selected from manganese oxide and material of low density, and mixtures thereof.

14. A method according to claim 13, wherein the low density material is selected from silica, titania, alumina, vermiculite, perlite, expanded clays and glass microspheres.

15. A method according to claim 14, wherein the silica, titania or alumina is or are of a form selected from aerogel, xerogel, pyrogenic, hydrophobic pyrogenic and precipitated forms.

16. A method according to any claim 1, wherein from 2 to 10 percent by weight of the reinforcing filaments are provided.

17. A method according to claim 1, wherein the reinforcing filaments are selected from silica, quartz, E glass and modifications thereof, S glass and modifications thereof, R glass, ECR glass, C glass, A glass, ceramic fibre materials, body-fluid-soluble fibres, and mixtures thereof.

18. A method according to claim 1, wherein the density of the pressed composition is from 300 to 1200 kg/m$^3$.

19. A method according to claim 18, wherein the density of the pressed composition is from 500 to 800 kg/m$^3$.

20. A method according to claim 1, wherein the heat treated body has a Shore A hardness greater than 50.

21. A method according to claim 20, wherein the heat treated body has a Shore A hardness greater than 65.

22. A method according to claim 21, wherein he heat treated body has a Shore A hardness not less than about 80.

23. A method according to wherein the heat treated body has a flexural strength greater than 450 kN/m$^2$.

24. A method according to claim 23, wherein the heat treated body has a flexural strength greater than 600 KN/m$^2$.

25. A method according to claim 24, wherein the heat treated body has a flexural strength not less than about 1000 kN/m$^2$.

26. A method of manufacturing a pressed thermal insulation body in the form of an outer part for a heater comprising the steps of:
    (1) providing a dry composition consisting of:
       (a) 65 to 98 percent by weight of volatilised silica containing a dispersion of 0.5 to 6 percent by weight of carbon;
       (b) 0 to 20 percent by weight of infra-red opacifier;
       (c) 0 to 10, percent by weight of particulate inorganic filler material; and
       (d) 1 to 15 percent by weight of reinforcing filaments;
    (2) pressing the dry composition from step (1) to form an outer part of a heater of a desired shape and density; and
    (3) heat treating the pressed outer part at a temperature in the range from 500 degree Celsius to 900 degrees Celsius to effect hardening thereof.

27. A method according to claim 1, wherein 83 to 98 percent by weight of the volatilised silica is provided in the composition.

28. A method according to claim 26, wherein the carbon content of the volatilised silica is from 0.8 to 2 percent by weight.

29. A method according to claim 26, wherein during heating of the body the carbon is burnt away such that less than 0.1 percent by weight thereof remains with reference to the volatilised silica.

30. A method according to claim 26, wherein the particulate inorganic filler is selected from pyrogenic and hydrophobic pyrogenic silica and mixtures thereof.

31. A method according to claim 26, wherein from 2 to 10 percent by weight of the reinforcing filaments are provided.

32. A method according to claim 26, wherein the reinforcing filaments are selected from silica, quartz, E glass and modifications thereof, S glass and modifications thereof, R glass, ECR glass, C glass, A glass, ceramic fibre materials, body-fluid-soluble fibres, and mixtures thereof.

33. A method according to claim 26, wherein the density of the pressed composition is from 500 to 800 kg/m$^3$.

34. A method according to claim 26, wherein the heat treated outer part has a flexural strength greater than 450 kN/m$^2$.

35. A method according to claim 34, wherein the heat treated outer part has a flexural strength greater than 600 kN/m$^2$.

36. A method according to claim 26, wherein the outer part is heat treated for from 15 to 25 minutes.

37. A method according to claim 36, wherein the outer part is heat treated for about 20 minutes.

38. A method according to claim 26 and including the step of co-moulding a heating element with the outer part as the outer part is pressed.

39. A method according to claim 38 and including the step of co-moulding a connector block with the heating element.

* * * * *